UNITED STATES PATENT OFFICE.

GEORGE N. JEPPSON, OF WORCESTER, MASSACHUSETTS, ASSIGNOR TO NORTON COMPANY, OF WORCESTER, MASSACHUSETTS, A CORPORATION OF MASSACHUSETTS.

METHOD OF TREATING REFRACTORY ELECTRIC-FURNACE PRODUCTS.

992,875.  Specification of Letters Patent.  Patented May 23, 1911.

No Drawing.  Application filed August 21, 1909. Serial No. 514,019.

*To all whom it may concern:*

Be it known that I, GEORGE N. JEPPSON, a citizen of the United States, residing at Worcester, in the county of Worcester and State of Massachusetts, have invented certain new and useful Improvements in Methods of Treating Refractory Electric-Furnace Products, of which the following is a specification.

The object of this invention is the provision of a method whereby certain highly refractory electric furnace products, and specifically silicid of carbon or carborundum, may be improved and rendered better adapted for the preparation of abrasive materials or implements, and for other purposes.

As is well known, silicid of carbon is prepared by the reduction in the electric furnace of sand by means of coke or other form of carbon. In this operation there occurs a simultaneous reduction of the impurities of the sand and coke, as for example oxids of iron, calcium, etc., with the formation of carbids, silicids or other reduction products. The separation of these in the washing processes to which the crushed product of the electric furnace is afterward submitted is incomplete, and their presence in the finished article or implement is highly objectionable and prejudicial. I have found however that the impurities exist chiefly in the form of a superficial coating on the grains, crystals or crystalline fragments of the silicid of carbon, being apparently excluded from the body of the grains by the phenomena attending crystallization; and that by suitably treating the crushed grains the impurities may be brought into such condition that they are capable of removal by a mulling or grinding operation. According to the present invention such impurities existing in the product as prepared in the electric furnace are first reoxidized by subjecting the material, previously crushed, and preferably but not necessarily reduced to such size or sizes as are suited for use, to an oxidizing roast under such conditions of time and temperature as fully to oxidize the impurities without injurious effect upon the silicid carbon: The fully oxidized material is then subjected to a mulling, tumbling or similar operation with the result that the oxidized impurities, such as silica, silicate of iron, etc., which are present chiefly as a coating upon the grains or adhere thereto, are detached by the abrading action of the grains. This operation also has the effect of shaping the grains and breaking down aggregates into their constituent grains. The mulled product, after washing, is found to consist essentially of the abrasive grains, freed from all adherent or admixed materials which might injuriously affect either the efficiency or the durability of the grains or of implements or articles prepared from them. The grains may then be graded and subjected to such further treatment as may be required by the intended use.

I claim:

1. The method of purifying silicid of carbon, which consists in roasting the material, suitably subdivided, under oxidizing conditions.

2. The method of purifying silicid of carbon, which consists in roasting the material, suitably subdivided, under oxidizing conditions, and separating the oxidized impurities from the purified grains.

3. The method of purifying silicid of carbon, which consists in roasting the material, suitably subdivided, under oxidizing conditions, and mulling the grains to separate therefrom the oxidized impurities.

In testimony whereof, I affix my signature in presence of two witnesses.

GEORGE N. JEPPSON.

Witnesses:
ALDUS C. HIGGINS,
ROBT. P. CAPRON.